United States Patent
Cyr et al.

(10) Patent No.: US 11,317,762 B2
(45) Date of Patent: May 3, 2022

(54) MULTI-BANK COOKING SYSTEM

(71) Applicant: PITCO FRIALATOR, INC., Bow, NH (US)

(72) Inventors: Steven J. Cyr, Londonderry, NH (US); Steven Savage, Concord, NH (US); Michael T. Fecteau, Derry, NH (US); John P. Gardner, Franklin, NH (US); Steven Gallerani, Northwood, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 0 days.

(21) Appl. No.: 16/473,527

(22) PCT Filed: Mar. 22, 2019

(86) PCT No.: PCT/US2019/023639
§ 371 (c)(1),
(2) Date: Jun. 25, 2019

(87) PCT Pub. No.: WO2019/216998
PCT Pub. Date: Nov. 14, 2019

(65) Prior Publication Data
US 2021/0330124 A1    Oct. 28, 2021

Related U.S. Application Data

(60) Provisional application No. 62/667,884, filed on May 7, 2018.

(51) Int. Cl.
*A47J 37/12*  (2006.01)
*B01D 29/60*  (2006.01)
*B01D 29/90*  (2006.01)
*B01D 35/157*  (2006.01)
*F24C 3/12*  (2006.01)

(52) U.S. Cl.
CPC ......... *A47J 37/1266* (2013.01); *A47J 37/129* (2013.01); *A47J 37/1223* (2013.01); *A47J 37/1242* (2013.01); *A47J 37/1285* (2013.01); *A47J 37/1295* (2013.01); *B01D 29/605* (2013.01); *B01D 29/902* (2013.01);
(Continued)

(58) Field of Classification Search
CPC .... A47J 37/12; A47J 37/1223; A47J 37/1233; A47J 37/1242; A47J 37/1257; A47J 37/1266; A47J 37/1288
USPC .................................... 99/407, 408
See application file for complete search history.

(56) References Cited

U.S. PATENT DOCUMENTS 3,964,378 A * 6/1976 Dunkelman ............ A47J 27/14
                                                                  99/425
5,617,777 A    4/1997 Davis et al.
(Continued)

*Primary Examiner* — Reginald Alexander
(74) *Attorney, Agent, or Firm* — Seyfarth Shaw LLP; Brian Michaelis

(57) ABSTRACT

A multi-bank cooking system includes multiple discrete cooking systems sharing common plumbing and integrated safety features. The multi-bank cooking system may include two or more rack-fryer systems, each with discrete frypots, operating mechanisms and cooking controllers. Each of the discrete cooking systems, may share a common plumbing system with integrated valves and controls receiving coordinated safety signals to facilitate safe and efficient operation of the system.

20 Claims, 6 Drawing Sheets

(52) U.S. Cl.
CPC .......... *B01D 35/1573* (2013.01); *F24C 3/126* (2013.01); *A47J 2203/00* (2013.01)

(56) References Cited

U.S. PATENT DOCUMENTS

| | | | |
|---|---|---|---|
| 6,378,420 B1 | 4/2002 | Savage et al. | |
| 2005/0056157 A1 | 3/2005 | Savage et al. | |
| 2006/0130670 A1* | 6/2006 | Johnson | A47J 37/1257 99/403 |
| 2008/0196596 A1* | 8/2008 | Forrest | A47J 37/1223 99/408 |
| 2017/0265683 A1* | 9/2017 | Gogel | A47J 37/1247 |

* cited by examiner

MULTI-BANK COOKING SYSTEM

CROSS-REFERENCE TO RELATED APPLICATION DATA

This application claims the benefit of U.S. Provisional Patent Application No. 62/667,884, filed on May 7, 2018, the disclosure of which is incorporated by reference herein.

FIELD

The present disclosure relates to systems for cooking food, and more particularly to deep fryer systems.

BACKGROUND

Deep frying systems, typically installed and used in restaurants and other large-volume cooking environments may be costly. Traditional deep frying systems may be limited in the amount of food that can be cooked, due to a singular frypot. Adding additional fryers (and thereby frypots) may increase the amount of food that can be cooked, but that will generally increase service and safety concerns. Safety concerns may be addressed by incorporating safety features into the individual flyers, but additional safety features in each fryer increases maintenance requirements and concerns.

SUMMARY

The present disclosure provides dual- or multi-bank deep frying systems for cooking food items. The disclosed systems may include two or more frypots, a common and coordinated plumbing system, and coordinated and shared safety mechanisms implemented to protect the system, its operators and the surrounding cooking environment.

According to one embodiment of the present disclosure, a multi-bank frying system is provided. The system may include a first and a second fryer assembly and a cabinet housing the first and second flyer assemblies. The cabinet may include at least one securable door with a protective edge/lip. A common drain may be in fluid communication with each of the first and second fryer assemblies and include a drain spout in fluid communication with the common drain. The drain spout may be rotatably mounted to the common drain and rotatable between a raised and a lowered position. A common filter pan may be disposed below the drain spout and have a height extending above a portion of the drain spout in the lower position and above the protective lip of the securable door. The system may further include a pan-in-place sensor to sense and indicate presence/placement of a common filter pan. A fluid presence sensor disposed in the common filter pan indicates presence of fluid in the common filter pan. A door sensor associated with the securable door is configured to transmit an affirmative signal upon sensing a closed state of the securable door. A controller may be in electrical communication with the pan-in-place sensor, the fluid presence sensor, the door sensor, and the first and second flyer assemblies and configured to allow operation of the first and second fryer assemblies upon receiving a first affirmative signal from the pan-in-place sensor, a second affirmative signal from the fluid presence sensor, and a third affirmative signal from the door sensor. A fluid shock arrestor may be disposed in a common manifold that delivers frying oil to the system, the fluid shock arrestor suppressing extreme vibration when a volume of fluid is introduced.

According to another embodiment of the present disclosure, a cooking system is provided. The cooking system may include a plurality of rack fryer assemblies. Each of the rack fryer assemblies may include an operator handle, a rack assembly removeably attached to the operator handle, a frypot, a burner assembly, a flow valve, and a control panel configured to control the burner assembly. The system may include a common drain in fluid communication with the flow valves of each of the plurality of rack fryer assemblies. A rotatable drain spout may be in fluid communication with the common drain. The drain spout may be rotatable between a raised and a lowered position. A cabinet may have at least one securable door with a protective lip. The cabinet may house the common drain, the drain spout and the common filter pan. The common filter pan may be disposed below the drain spout and sized and configured such that the drain spout extends below a top edge of the filter pan when drain spout is in the lowered position and the drain spout rises above the top edge of the filter pan when the drain spout is in the raised position. The cooking system may further include a common pan-in-place sensor, a common fluid presence sensor disposed in the filter pan, and a common door sensor configured to transmit an affirmative signal upon sensing a closed state of the securable door. A controller may be in electrical communication with the each of the control panels of the plurality of flyer assemblies, the pan-in-place sensor, the fluid presence sensor, and the door sensor. The controller may be configured to allow operation of the plurality of fryer assemblies upon receiving safety signals including a first affirmative signal from the pan-in-place sensor, a second affirmative signal from the fluid presence sensor, and a third affirmative signal from the door sensor.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which.

DETAILED DESCRIPTION

The present disclosure provides a multi-bank cooking system suitable for use in an high volume cooking operation, such as a restaurant or large cooking environment. Embodiments of the present disclosure may include multiple discrete cooking systems sharing common plumbing and integrated and coordinated safety features. The multi-bank cooking system may include two or more rack-fryer systems, each with discrete frypots, operating mechanisms and cooking controllers. Each of the discrete cooking systems, may share a common plumbing system with integrated flow valves and controls to facilitate safe, efficient and coordinated operation of the system.

Figure 1:
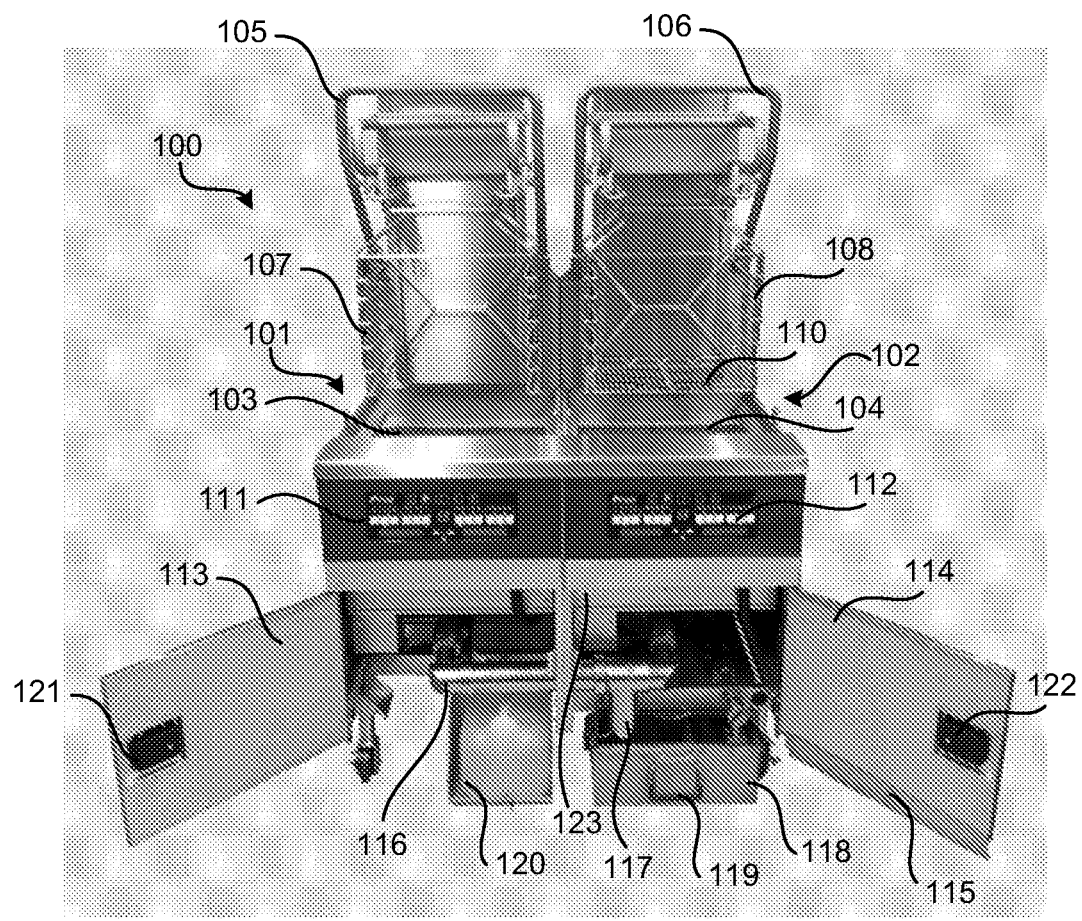
FIG. 1 is a diagram of a dual-bank rack flyer cooking system according to an embodiment of the present disclosure.

FIG. 1 is a diagram of a dual-bank rack flyer cooking system 100 according to an embodiment of the present disclosure. The dual bank rack fryer 100 may include two discrete rack flyer assemblies 101, 102, each rack flyer assembly 101, 102 independently operated and controlled. Each rack flyer assembly 101, 102 may include an operating handle 105, 106 and a rack assembly 107, 108. Each rack assembly 107, 108 may include a series of parallel racks or shelves for receiving a rack or tray 110. The rack assembly 107, 108 may be removably attached or hung to a portion of the operating handle 105, 106. Each rack fryer assembly 101, 102 may further include separate frypots 103, 104. The frypots 103, 104 may be filled with a cooking medium, such as a cooking oil, or other cooking medium (e.g., lard). Individual control panels 111, 112 may provide a user-interface to an operator for monitoring and controlling the individual cooking environments. The control panels 111, 112 may include pre-programmed settings, operational controls, timers and other functions associated with the operation of each individual rack flyer assembly 101, 102.

In operation, each rack flyer assembly 101, 102 may be used independently when cooking. An operator may place an amount of food to be cooked in the frypot on individual racks or trays 110. Each tray 110 may then by placed on a respective rack assembly 107, 108. The tray 110 may be appropriately sized and shaped to engage with the parallel shelves of the rack assembly 107, 108. When the food is loaded on the trays 110, the operator may (manually or by automatic control) lower the operating handle 105, 106 towards the frypot 103, 104. The operating handle may be actuated such that the attached rack assembly 107, 108 is lowered into the frypot where the food is cooked by heated oil. Multiple trays 110 may be used to ensure the food items remain in place while cooking by forming a top barrier preventing the food items from floating off of the trays 110.

The operating handle 105, 106 may be hinged, levered, or otherwise actuated to lower the rack assemblies 107, 108 in to the oil. Pneumatics and/or electrical electronic linear motor(s) for automatic control, and/or counter-balancing or other weight distribution methods may be used to provide an easier, and more efficient lowering mechanism. After the food is lowered into the oil, the operator may engage the control panel to set a timer, alarm, or other control mechanism to alert the operator when the cooking cycle is over. At the end of the cooking cycle, the operator may (via manual or automatic control) lift the operator handle 105, 106, raising the rack assembly 107, 108 out of the oil. Excess oil on the trays 110, food items and the rack assembly 107, 108 may drain back into the frypot 103, 104. The trays 110 may then be removed from the rack assembly 107, 108 and moved to another food preparation station or area.

The rack flyer assemblies 101, 102 according to the disclosure may share a common plumbing and filtering system. A common drain 116 may be in fluid communication with each of the frypots 103, 104 of the rack fryer assemblies 101, 102. The common drain 116 may include pipes, valves, pumps and the like suitable for controlling and transporting cooking oil to and from the frypots 103, 104 and common filter pan. A drain spout 117 may be in fluid communication with the common drain 116. The drain spout may be sized and shaped to allow the flow of oil from the common drain 116 to a common, integrated filter pan 118. The filter pan 118 may receive used or particle-laden oil whereby the oil is passed through a filtering mechanism or material and returned to the frypot 103, 104. The filter pan 118 may be slideable or otherwise removable from substantially beneath the frypot(s) of the cooking system 100. A handle 119 may be used by an operator to remove or replace the filter pan 118.

The dual-bank rack fryer system 100 may include securable doors 113, 114 to enclose the cabinet and plumbing and filtering mechanisms, etc. associated with the rack fryer assemblies 101, 102. The cabinet of the rack flyer assemblies 101, 102 may house the common drain 116, pumps, additional plumbing, filter pan 118, a shelf 120 to hold a JIB ("Jug-In-a-Box"—portable oil canister or reservoir) or other oil container, and other equipment and electronics associated with the operation of the rack fryer assemblies 101, 102. The securable doors 113, 114 may include latches or locks 121, 122 to secure the cabinet from accidental or unauthorized access. A protective edge or lip 115 may be attached on the securable door 114. As detailed below the protective lip 115 may prevent the removal of the filter pan 118 when the securable doors are closed and/or locked. A door sensor 123 may be operatively placed on the inside of the cabinet. The door sensor 123, as described below, may function to alert an operator of an open cabinet door 114, or be functionally tied to the operation of the rack flyer assemblies 101, 102 and/or the filtering system.

Figure 2:
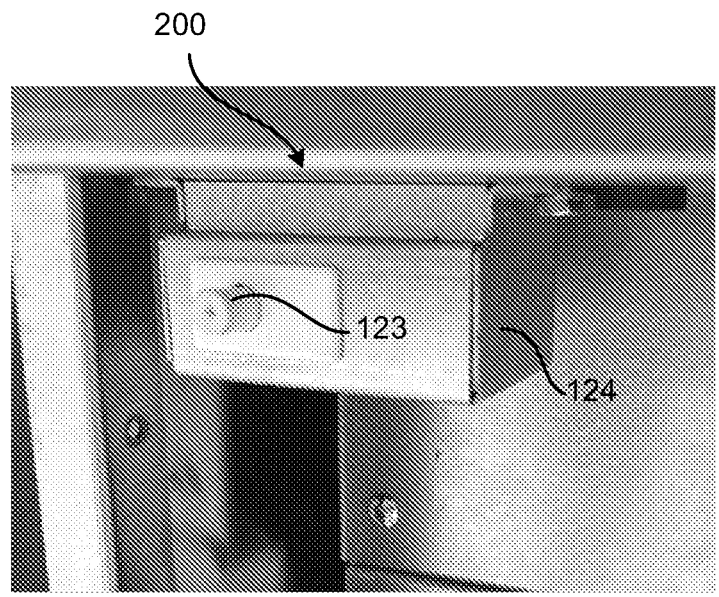
FIG. 2 is a close-up view of a door sensor according to an embodiment of the present disclosure.

FIG. 2 is a close-up view of a door sensor 123 according to an embodiment of the present disclosure. The door sensor 123 may serve as a safety mechanism to prevent unauthorized or unsafe operation of the system. For example, the door sensor 123 may be in electronic communication with the control panel and other control mechanisms that engage a filtering operation. The door sensor 123 may operate to prevent a filtering operation if the cabinet door is not securely closed in place. When a filtering operation is initiated after a cooking cycle is complete, the oil in the frypot may still retain the heat from the cooking operation when the oil is drained from the frypot to the filter pan. As such, draining the frypot into an open-to-air filter pan with cabinet doors open can create a hazardous situation. Hot oil may splash an operator or splash to the floor creating a slippery and unsafe surface in the surrounding areas.

The door sensor 123 may be placed in a casing 124 that is mounted on the underside of the cabinet. The door sensor 123 may be implemented in the form of a push button-like pressure sensor that, when sufficient pressure is applied to the push-button portion, generates an affirmative signal to a controller that the cabinet door is securely in place. The casing 124 may be formed from metal and placed appropriately such that the sensor mechanics engage with the cabinet door when the door is properly closed. The affirmative signal may be generated by the completion of an electrical circuit when the moveable portion of the push-button sensor is depressed sufficiently to latch/lock the door and complete an electric circuit. Other sensor mechanisms may be implemented, such as optical, contact relays, or the like. The affirmative signal may be received by a system controller which in turn, may allow further operation of the system, including performing a filtering/draining operation. If a filtering operation is initiated without an affirmative signal from the door sensor 123, the system controller may issue an error message or alert and the filtering operation may be interrupted.

Figure 3:
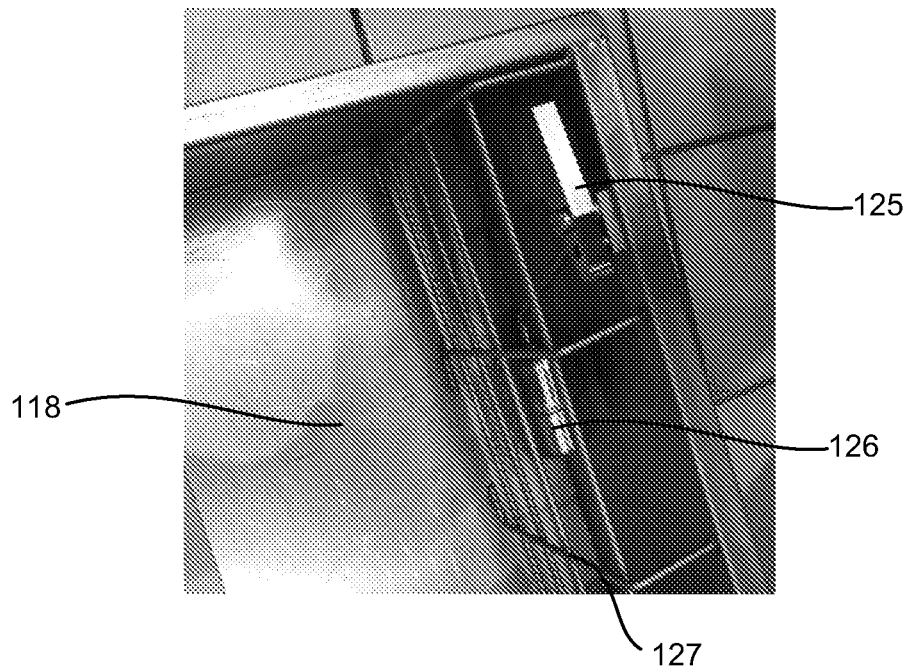
FIG. 3 is a top-down view of a filter pan with fluid presence sensor according to an embodiment of the present disclosure.

FIG. 3 is a top-down view of a filter pan 118 according to an embodiment of the present disclosure. The filter pan 118 may include additional sensors related to the operation of the system. For example, a pan-in-place pan sensor 125 may be implemented in the filter pan that signals the controller that the filter pan 125 is in place and ready to receive oil. The pan-in-place sensor 125 may be a relay, optical sensor, or the like, that, when the filter pan is properly stowed and in place in the cabinet of the system, electrically communicates to the system controller that a filtering/draining operation may proceed. If the pan is not properly in place and/or the controller does not receive a signal from the pan-in-place sensor, the controller will prevent or interrupt any filtering/draining operation.

The filter pan may also include an oil-presence sensor 126 that may detect and communicate to the controller the existence or lack of oil or other fluid in the filter pan. If the oil-presence sensor 126 indicates oil, or some other liquid, is present in the filter pan 118, the controller may not allow a filtering operation. The filtering operation may be prevented to avoid additional volumes in the filter pan 118 which can lead to spillage and other hazardous conditions. The oil-presence sensor 126 may be a float sensor, a conductive sensor, a capacitive sensor, optical sensor, or the like, that operates to detect the presence of a liquid.

The pan-in-place sensor 125 and the oil-presence sensor 126 may be protected by a cage 127 or other structure to avoid damage to the sensors and their components as the filter pan is removed from the cabinet, cleaned or otherwise manipulated.

Figure 4:
FIG. 4 is a perspective view of a lowered drain spout according to an embodiment of the present disclosure.

FIG. 4 is a perspective view of a lowered drain spout according 117 to an embodiment of the present disclosure. The drain spout 117 may be rotatably attached to the system plumbing and the common drain. The drain spout 117, in fluid communication with the common drain, may be placed in a downward position during filtering operations. When a filtering operation is initiated, oil may be released, via control of one or more valves in the plumbing system, from a frypot to the common drain and on to the drain spout 117 where the oil pours into the filter pan 118. To prevent splash-back and ensure the draining oil pours into the filter pan 118 and not elsewhere in the cabinet or surrounding floor, the drain spout 117 and the filter pan 118 are sized and shaped (i.e. mechanically configured), according to the disclosure, to ensure that during draining into the filter pan 118 the drain spout 117 is in its downward position and the lower edge of the drain spout will fall below the upper lip of the filter pan 118 so the filter pan cannot be moved out from under the drain spout 117. Such a configuration also requires the displacement of the filter-pan in order to raise the drain spout 117, and as such, if the drain spout 117 were to be raised the filter pan would move and the pan-in-place sensor 126 may be triggered, preventing or interrupting continued use of the system.

During non-operational states, the drain spout 117 may be raised to allow for the removal of the filter pan 118 for cleaning, maintenance, or the like. The drain spout 117 may include a drain handle 129 by which an operator may grasp and lift the drain spout 117 such that the lower edge of the drain spout 117 is raised above the upper lip of the filter pan 118 allowing the filter pan 118 to be removed, as shown in FIG. 5.

Figure 5:
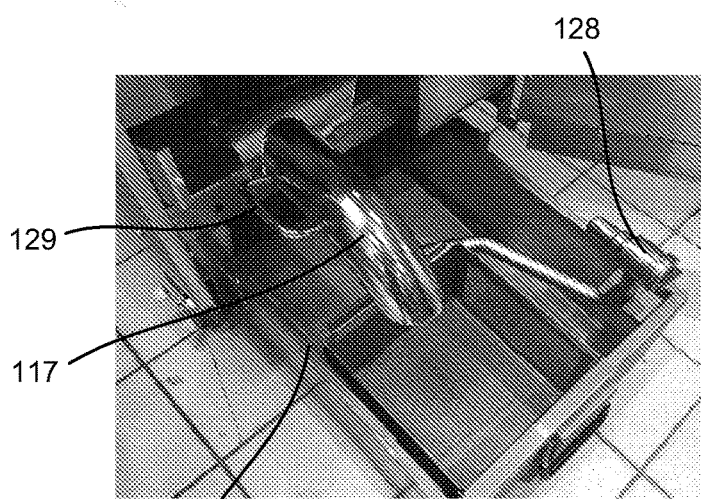
FIG. 5 is a perspective view of a raised drain spout according to an embodiment of the present disclosure.

FIG. 5 is a perspective view of a raised drain spout 117 according to an embodiment of the present disclosure. As shown, the drain spout 117 may be rotatably lifted by the drain handle 129 to allow for the filter pan 118 to be slidably removed into or from underneath the system cabinet. The filter pan may be resting on the floor, or may be removably mounted to the cabinet. The filter pan may be removed, using the filter pan handle 119 to allow for additional cleaning, and maintenance and/or servicing of an in-line filter 128. The in-line filter 128 may be implemented such that oil in the filter pan may be moved by a pump through the in-line filter 128 containing a filter medium to remove debris and other solids from used oil. The in-line filter 128 may swivel, rotate or otherwise move about the filter pan 118 to accommodate access and service of the filtering components. After service, cleaning or other maintenance is performed the in-line filter 128 may be replaced, the drain spout 117 may be lowered and the filter pan 118 may be slid back into place.

Figure 6:
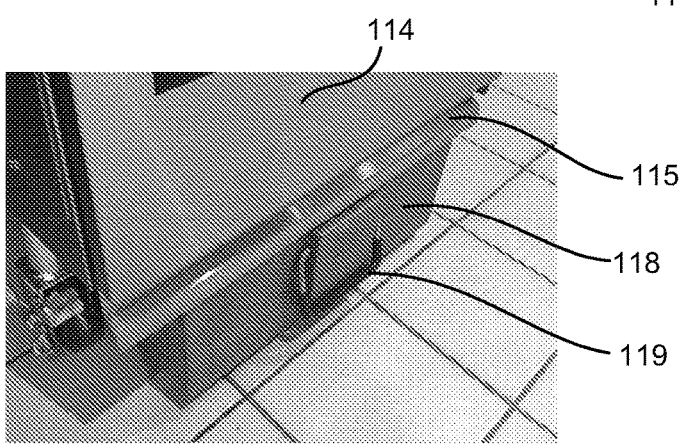
FIG. 6 is a perspective view of an in-place filter pan and safety door with protective edge/lip according to an embodiment of the present disclosure.

FIG. 6 is a perspective view of an in-place filter pan 118 and securable door 114 according to an embodiment of the present disclosure. When the filter pan 118 is in place and the securable door 114 is in place and secure, removal of the filter pan is prevented. A protective edge or lip 115 may be attached to or be an integral part of the securable door 114 such that the protective lip 115 extends from the securable door 114 below the top edge of the filter pan 118. The securable door 114 and protective lip 115 in place, precludes an operator from removing the filter pan 118 when a filtering operation may be underway, as the filter pan 118 will strike the protective lip 115 and further movement of the filter pan 118 will be impeded.

Figure 7:
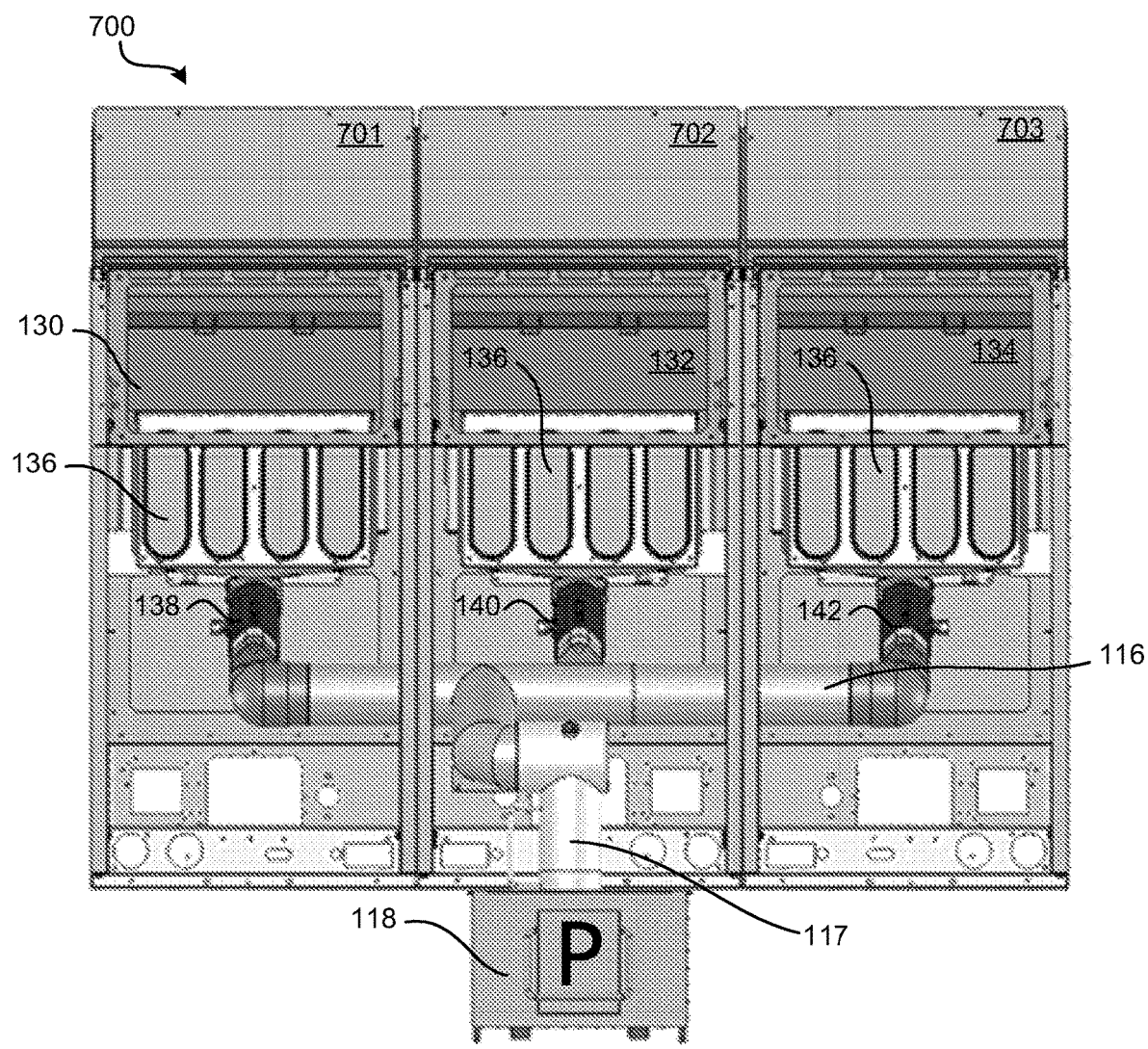
FIG. 7 is a conceptual diagram of a multi-bank cooking system according to an embodiment of the present disclosure.

FIG. 7 is a conceptual diagram of a multi-bank cooking system 700 according to an embodiment of the present disclosure. Additional safety precautions of the multi-bank cooking system 700 may be implemented through a programmable controller configured to monitor and control the plumbing capabilities of the system. As shown, the multi-bank cooking system 700 may include three rack fryer assemblies 701, 702, 703 with individual cooking environments and a shared common drain 116 and filter pan 118. Each rack fryer assembly 701, 702, 703 may include independent frypots 130, 132, 134, individual burner assemblies 136 and individual flow valves 138, 140, 142. A controller (not shown) may be in electrical communication with the flow valves 138, 140, 142 such that the controller may actuate the flow valves 138, 140, 142 in a coordinated and isolated manner to safely ensure proper drainage, filtering and return of oil to each respective frypot 130, 132, 134.

For example, the system controller may be preprogrammed to automatically drain, filter and return cooking oil after a cooking cycle is completed. The controller may be programmed to automatically initiate a command to initiate a filtering operation on a first rack fryer assembly 701 (ensuring first that the filter pan presence sensor indicates the pan is in place, the filter pan fluid sensor indicates the pan is empty and the securable door sensor indicates the cabinet door is closed so the door edge/lip ensures the filter pan cannot be moved during further operation). The controller may transmit a signal to drain the frypot 130 to the filter pan 118 for filtration and return. The controller may first determine if any of the other rack fryer assemblies 702, 703 are in a filtering operation and if their respective flow valves 140, 142 are open. If no other filtering operation is occurring, the controller may send a signal to open the flow valve 138 in fluid communication with the frypot 130 of the first rack fryer assembly 701. Oil from the frypot 130 of the first rack flyer assembly 701 may drain through the common drain 116 and to the filter pan 118, where the oil may undergo a filtering process. After which the newly filtered, or recycled, oil may be returned to the frypot 130 of the first rack fryer assembly 701 using a pump and return plumbing (not shown). The recycled oil may then be reheated to become available for a subsequent cooking operation. The controller may issue an alert or notification indicating the completion of the filtering operation.

If during the filtering operation, a cooking cycle completes on either the second rack fryer assembly 702 or the third rack flyer assembly 703, the controller may issue a warning or other alert to an operator indicating that the filter pan is in use. Additionally, the controller may lockout operation of the flow valves 140, 142 in communication with the frypots 132, 134 of the second rack fryer assembly 702 and the third rack fryer assembly 703. The lockout of the other flow valves 140, 142 may supersede the automatic filtering operation preprogrammed to recycle the oil in the second rack flyer assembly 702 and the third rack fryer assembly 703.

Once the filtering operation related to the first rack fryer assembly 701 is complete, the controller may initiate a filtering operation for the second rack flyer assembly 702 in a similar manner (first ensuring the filter pan sensors discussed hereinbefore are in the proper state), by opening the flow valve 140 in fluid communication with the frypot 132 of the second rack flyer assembly 702 and locking out the flow valves 138, 142 of the first rack fryer assembly 701 and the third rack fryer assembly 703. The filtering operation triggered for the third rack fryer assembly 703, and any subsequent filtering operations for the first rack fryer assembly 701, may be queued until the filtering operation for the second rack fryer assembly 702 is completed, i.e., the oil from the frypot 132 is drained, filtered, and pumped back to the second rack fryer assembly 702.

The controller and its programmed filtering operations ensure a safe, efficient and coordinated automatic filtering process that ensures the filter pan 118 and the common drain 116 are properly engaged, and are not flooded with excess oil. The controller, flow valves, common drain and filter pan may be scaled to any number of rack fryer banks.

Figure 8:
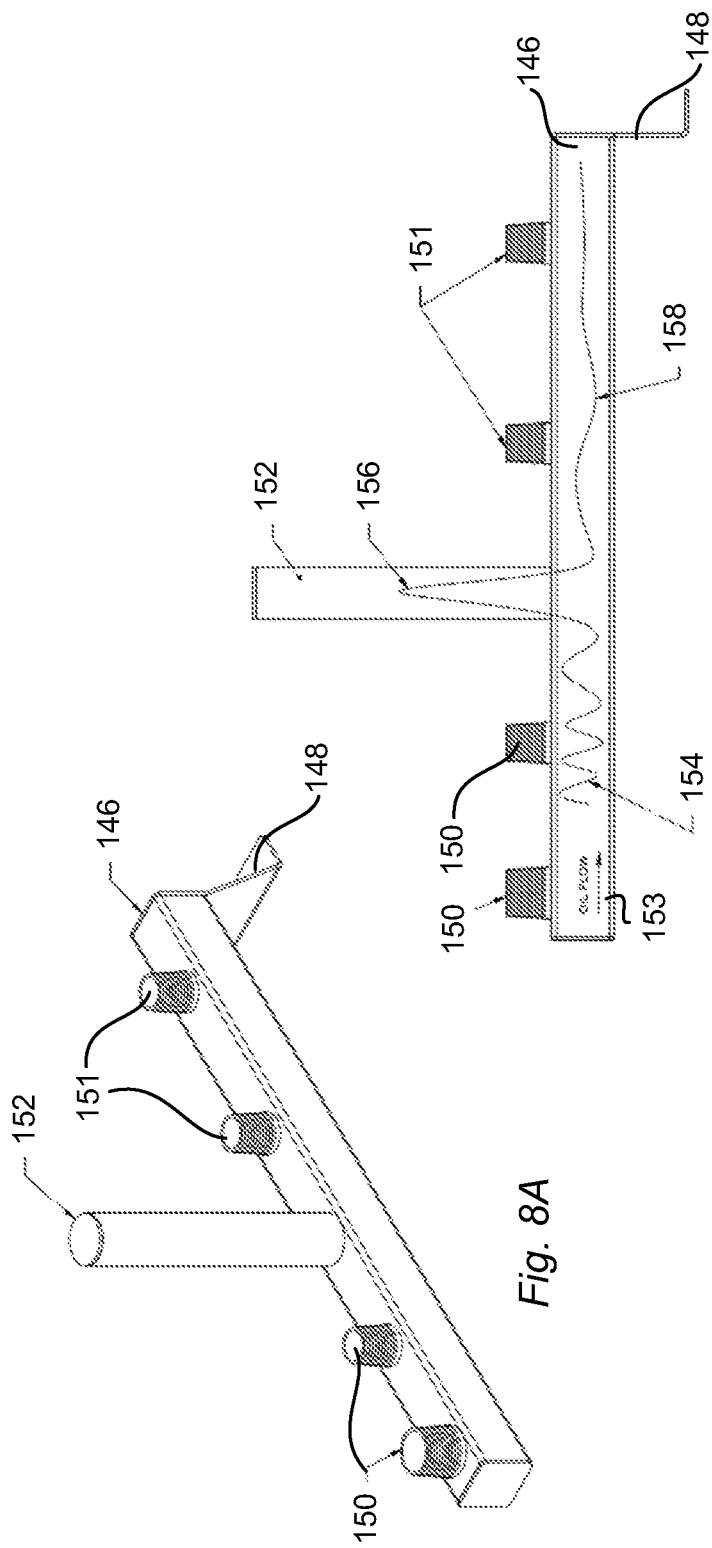
FIG. 8A is a perspective view of a fluid shock arrestor according to an embodiment of the present disclosure.
FIG. 8B is a front view of the fluid shock arrestor of FIG. 8A.

An additional safety mechanism implemented in the multi-bank cooking system may be a fluid shock arrestor configured to absorb and dissipate shock and vibration of the cooking oil in the system plumbing. FIG. 8A is a perspective view of an arrestor 144 according to an embodiment of the present disclosure. FIG. 8B is a front, sectioned view of the arrestor 144. The arrestor 144 may be in the form of a manifold 146 or other fluid carrier through which oil may be passed between the frypot and the filter pan, or elsewhere in the plumbing system, such as a bulk oil tank, local oil storage container, waste oil tank, or the like. The arrestor 144 may include a mounting bracket 148 to secure the arrestor 144 to a fixed point on the cooking system cabinetry, or another structure in the system. The manifold 146 may include a number of connection points including one or more oil inlets 150 and one or more oil outlets 151. The arrestor 144 may be installed in the system plumbing such that the oil flow 153 is directed into the oil inlets 150 and out the outlet connection points. Valves (not shown) may be operatively connected to the inlets 150 and the outlets 151 and controlled by a controller to direct the oil flow 153.

In operation, the actuation of flow valves through their open and closed states may create a turbulent oil flow through the system plumbing. Additional moving components in the cooking system or agitation of the system by an outside force can further create shock waves, vibrations and other disturbances in the oil flow 153 that may create a shock wave 154 within the plumbing system. If such disturbances are not dissipated, fluid pressure may build inside of the plumbing and cause damage to the plumbing, cooking system or its operators when the pressure is released by the next valve opening. To alleviate the shock wave 154 or other disturbances carried by an oil flow 153, an arrestor column 152 may be disposed between the inlets 150 and the outlets 151. The arrestor column 152 may include a volume of air such that when the oil flow 153, and the shock wave 154 in the oil pass by the arrestor column 152, the turbulent oil 156 flows into the arrestor column 152 and out, with the shock wave having been largely absorbed resulting in less turbulent oil flow 158 arriving to the outlet 151. As such, when the next valve in system is actuated, there is no built up pressure remaining in the oil flow.

Figure 9:
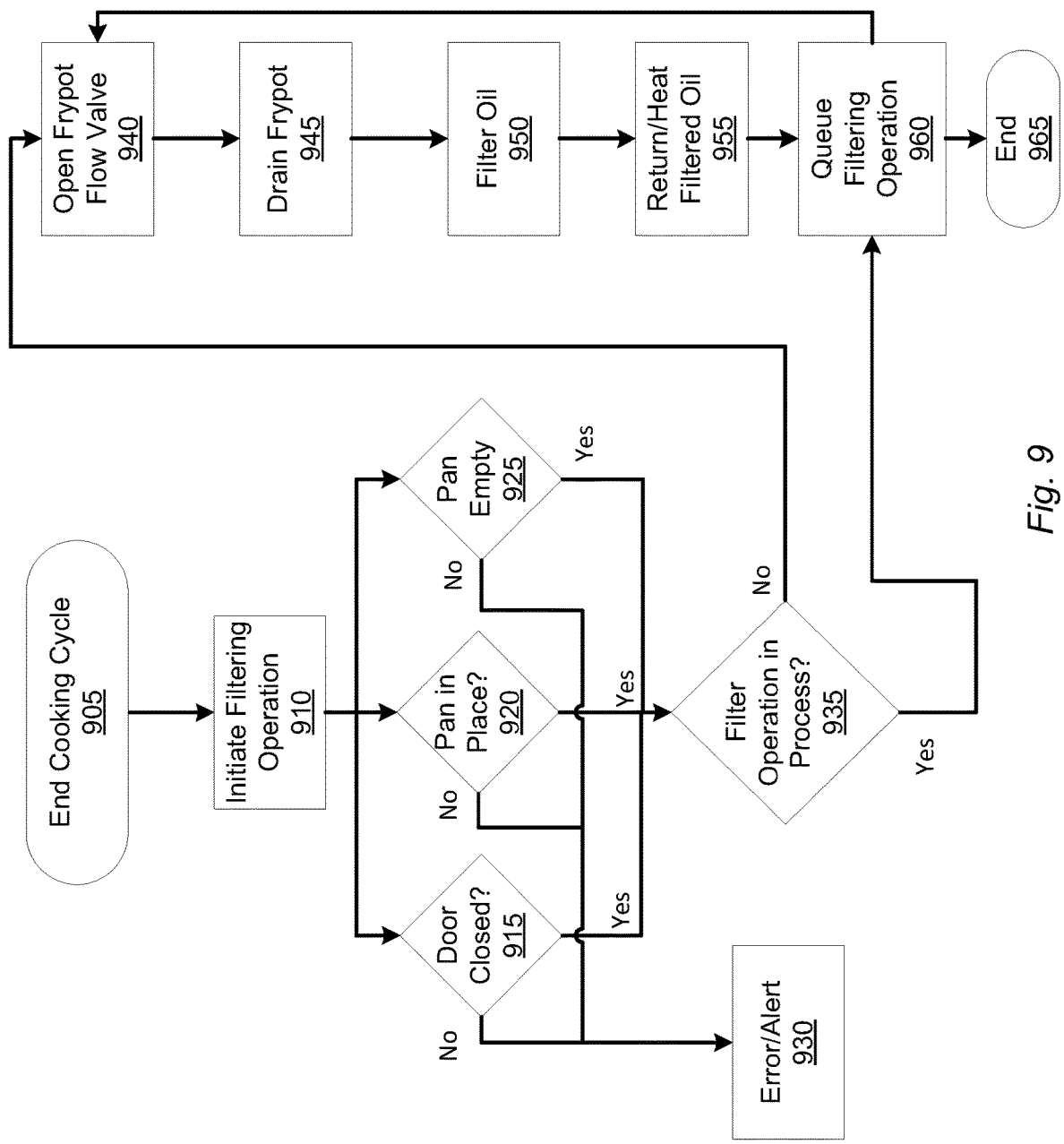
FIG. 9 is a flow chart of a filtering operation according to an embodiment of the present disclosure.

FIG. 9 depicts a flow chart 900 of a filtering operation according to an embodiment of the present disclosure. As detailed herein, the multi-bank cooking system may feature a variety of safety mechanisms to ensure safe and efficient operation of the cooking system. The multi-bank cooking system may include a controller that is programmed to automatically initiate a filtering operation after the completion of a cooking cycle. A cooking cycle may be a predetermined amount of time, or a number of timed cooking operations. As shown in block 905 the controller may receive a signal from one of the fryer assemblies that a cooking cycle has ended. As shown in block 910, the controller may automatically initiate a filtering operation to filter, clean or otherwise, recycle the oil present in the frypot. As shown in block 915, the controller may check to see if a securable door to the system cabinet is closed. As described above, an open-door condition may create an unsafe condition during which hot or dirty cooking oil should not be drained. The door sensor implemented in the cabinet may sense whether the securable doors are secured and closed. The door sensor, discussed hereinbefore, may be any of a number of sensors including a pressure sensor, an optical sensor, or the like. When the cabinet door is securely closed, the door sensor may transmit a first affirmative signal to the controller indicating a door-closed condition. If the door sensor senses an open-door condition an error or alert may be issued, as shown in step 930. The error or alert may be in the form of an audible or visual signal intended to notify an operator of the error. The operator may close the door and reinitiate the filtering operation, or alternatively, the system may automatically return to the filtering operation upon receiving the affirmative signal from the door sensor.

As shown in block 920 the controller may also determine if the filter pan is in place. The pan-in-place sensor, as described herein, may be used to inform the controller that the filter pan is in place and is ready to receive the oil for filtration. If the pan is in place, a second affirmative signal may be transmitted from the pan-in-place sensor to the controller and the filtering operation may proceed. If an affirmative signal is not received, the system may generate an error or alter, as shown in block 930.

As shown in block 925, the controller may determine if the filter pan is empty and/or has the capacity to receive the volume of oil from the fry pot. The fluid presence sensor, as described herein, may determine a presence or a level of fluid present in the filter pan prior to a filtering operation. If the fluid presence sensor determines there is a fluid present, or not enough volume in the filter pan to accommodate the oil from the frypot, the sensor may report such a condition to the controller and an alert or error may be issued, as shown in block 930. If the fluid presence sensor determines there is no fluid present in the filter pan, or there is sufficient room, a third affirmative signal may be transmitted to the controller and the filtering operation may proceed.

The door sensor, the pan-in-place sensor, and the fluid presence sensor provide individual safety benefits, as well as a redundant system designed to ensure safe operation of the multi-bank cooking system. If any one of the three sensors fails to provide an affirmative signal, the filtering operation may not proceed. The controller may receive signals from each of the sensors simultaneously or may poll the sensors in sequence. The signals from the sensors may be read in any order, or process at the same time. While the affirmative signals described herein refer to a first, second and third affirmative signal, one skilled in the art will appreciate that such designations are not based in time or order, and such signals may be generated and transmitted in any order or sequence, including substantially simultaneously.

Once the three affirmative signals are received from the door sensor, the pan-in-place sensor, and the fluid presence sensor, the controller may determine if another filtering operation is in process, as shown in block 935. The multi-bank cooking system includes multiple independent cooking systems, however, they may share a common drain and filtering system. As such, the controller may determine that if a filtering operation is already underway from another fryer assembly, the present fryer assembly filtering operation may be queued in memory, as shown in step 960. When the already-occurring filtering operation is completed, the controller may process the next filtering operation in the queue.

If no filtering operation is currently underway, the controller may open the flow valve of the fry pot, as shown in block 940. The controller may be in electrical communication with the valve or a valve controller that is configured and able to open the flow valve to establish fluid communication between the frypot, the common drain, the drain spout and the filter pan. As shown in block 945, the frypot may drain the used cooking oil through the open flow valve and into the filter pan. As shown in block 950, the cooking oil may be filtered in the filter pan by any number of possible filtering systems and methods. For example, the oil may be pumped through an in-line filter containing a filtering medium that allows the passage of oil, but not debris and other solid particles suspended in the oil. Other filtering methods may include a gravity filter, cyclone filter, or the like.

Once the oil is filtered, as shown in block 955, the clean oil may be returned to the frypot via a pump and additional plumbing from the filter pan back to the frypot. The clean, filtered oil may be reheated and made ready for another cooking cycle. The controller, as shown in block 960, may consult the queue to determine if another filtering operation was attempted during the previous operation. If a filtering operation for another fryer assembly was put in the queue, the controller may, as shown in block 940, initiate the filter process by opening the flow valve to that frypot. If there are no filtering operations queued, the filtering operation process may end until another cooking cycle is complete and an automatic filtering operation is started again.

While embodiments of the present disclosure describe multi-bank rack flyers as two or three rack flyer systems, one skilled in the art will appreciate that the number of fryers may be scaled to any of various sizes as a function of physical space limitations and requirements. Further, one skilled in the art will recognize that, while rack fryers are described, other oil-based cooking systems and flyers may be implemented without deviating from the scope of the invention.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the description and following claims, it is understood that terms such as "first," "second," "third," "above," "below," and the like, are words of convenience and are not to be construed as limiting terms unless expressly stated otherwise.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A multi-bank frying system comprising:
  a first and a second fryer assembly,
  a cabinet housing the first and second fryer assemblies, the cabinet comprising at least one securable door with a protective lip;
  a common drain in fluid communication with each of the first and second flyer assemblies, the common drain including a drain spout in fluid communication with the common drain, the drain spout rotatably mounted to the common drain, the drain spout rotatable between a raised and a lowered position;
  a filter pan disposed below the drain spout, the filter pan having a height extending above a portion of the drain spout in the lowered position and above the protective lip of the securable door, the height of the filter pan extending below the drain spout in the raised position,
  a pan-in-place sensor;
  a fluid presence sensor disposed in the filter pan;

a door sensor configured to transmit an affirmative signal upon sensing a closed state of the securable door; and a controller in electrical communication with the pan-in-place sensor, the fluid presence sensor, the door sensor, and the first and second fryer assemblies, the controller configured to allow operation of the first and second flyer assemblies upon receiving an first affirmative signal from the pan-in-place sensor, a second affirmative signal from the fluid presence sensor, and a third affirmative signal from the door sensor.

2. The multi-bank flying system of claim 1 wherein the securable door is not closable when the drain spout is in a raised position.

3. The multi-bank flying system of claim 1 wherein the drain spout comprises a drain handle.

4. The multi-bank frying system of claim 1 wherein the filter pan is removable and further comprises a handle.

5. The multi-bank flying system of claim 1 wherein each of the first and second fryer assemblies comprising a frypot, a burner assembly, and a flow valve in fluid communication with the frypot, each of the flow valves in fluid communication with the common drain.

6. The multi-bank frying system of claim 5 wherein the controller is further configured to:

automatically initiate a filtering operation for the first or second fry assemblies upon completion of a cooking cycle, the filtering operation.

7. The multi-bank frying system of claim 6 wherein the filtering operation comprises:

opening the flow valve to drain a volume of cooking oil from the frypot to the filter pan through the common drain and the drain spout;

filtering the volume of cooking oil through a filtering medium;

returning the volume of cooking oil to the frypot.

8. The multi-bank frying system of claim 7 wherein the controller is further configured to prevent a subsequent filtering operation during the filtering operation.

9. The multi-bank frying system of claim 8 wherein the controller prevents the subsequent filtering operation by locking out the flow valve of the fryer assembly associated with the subsequent filtering operation.

10. The multi-bank frying system of claim 1 wherein the door sensor is a pressure sensor disposed such that the securable door depresses the pressure sensor when closed.

11. The multi-bank flying system of claim 1 wherein the pan-in-place sensor is a contact relay with a first portion disposed on the filter pan and a second portion located on the cabinet, the first affirmative signal generated by the engagement of the first and second portions of the contact relay.

12. The multi-bank frying system of claim 1 wherein the pan-in-place sensor comprises an optical sensor.

13. The multi-bank frying system of claim 1 wherein the fluid presence sensor comprises a float sensor.

14. The multi-bank frying system of claim 1 wherein the fluid presence sensor comprises a capacitive sensor.

15. The multi-bank frying system of claim 1 further comprising an arrestor in fluid communication with at least one of the first and second fryer assemblies.

16. The multi-bank frying system of claim 15 wherein the arrestor comprises an arrestor column housing a volume of air, wherein the volume of air dissipates a disturbance of cooking oil.

17. The multi-bank frying system of claim 15 wherein the arrestor is disposed between the fryer assembly and the drain spout.

18. The multi-bank system of claim 1 wherein at least one of the first and second flyer assemblies comprise a rack fryer.

19. A cooking system comprising:

a plurality of rack fryer assemblies, each of the rack fryer assemblies comprising:
  an operator handle;
  a rack assembly removably attached to the operator handle;
  a frypot;
  a burner assembly;
  a flow valve; and
  a control panel configured to control the burner assembly;

a common drain in fluid communication with the flow valves of each of the plurality of rack fryer assemblies;

a rotatable drain spout in fluid communication with the common drain, drain spout rotatable between a raised and a lowered position;

a cabinet comprising at least one securable door, the at least one securable door comprising a protective lip, the cabinet housing the common drain, the drain spout and the filter pan;

a filter pan disposed below the drain spout;

a pan-in-place sensor;

a fluid presence sensor disposed in the filter pan;

a door sensor configured to transmit an affirmative signal upon sensing a closed state of the securable door; and a controller in electrical communication with the each of the control panels of the plurality of fryer assemblies, the pan-in-place sensor, the fluid presence sensor, and the door sensor, the controller configured to allow operation of the plurality of fryer assemblies upon receiving an first affirmative signal from the pan-in-place sensor, a second affirmative signal from the fluid presence sensor, and a third affirmative signal from the door sensor.

20. The cooking system of claim 19 wherein the controller is further configured to automatically initiate a filtering operation of a first rack fryer assembly upon completion of a cooking cycle and preventing operation of all of the flow valves except the flow valve of the first rack fryer assembly until the filtering operation is complete.

* * * * *